United States Patent
Chung et al.

[11] Patent Number: 6,042,635
[45] Date of Patent: Mar. 28, 2000

[54] METHOD FOR WETTING A FILTER ELEMENT

[75] Inventors: W. J. Chung, Shuang-shi-Hsiao-Cheng; C. F. Lin, Tao Yuan, both of Taiwan

[73] Assignee: Taiwan Semiconductor Manufacturing Co., Ltd., Hsin-Chu, Taiwan

[21] Appl. No.: 09/090,760

[22] Filed: Jun. 4, 1998

[51] Int. Cl.[7] .................................................. B01D 19/00
[52] U.S. Cl. .................................. 95/29; 95/30; 95/260; 96/175; 96/389; 55/385.2
[58] Field of Search ................................ 95/29, 30, 260; 96/389, 175; 55/385.1, 385.2

[56] References Cited

U.S. PATENT DOCUMENTS

| | | | |
|---|---|---|---|
| 5,051,116 | 9/1991 | Mattsson | 95/260 |
| 5,409,523 | 4/1995 | Haeuser | 95/260 |
| 5,519,670 | 5/1996 | Walter | 95/260 |
| 5,591,252 | 1/1997 | Haeuser | 95/260 |
| 5,792,237 | 8/1998 | Hung et al. | 95/241 |
| 5,834,625 | 11/1998 | Kraus, Jr. et al. | 96/175 |
| 5,882,378 | 3/1999 | Tarutani et al. | 55/385.2 |

*Primary Examiner*—David A. Simmons
*Assistant Examiner*—Minh-Chau T. Pham
*Attorney, Agent, or Firm*—Tung & Associates

[57] ABSTRACT

A method for wetting a filter element by a high viscosity liquid and an apparatus for practicing such method are provided. In the method, a sealable container that is equipped with a vibration device and is capable of holding a pressurized liquid therein is used. The vibration device creates a vibration in the pressurized liquid such that trapped air bubbles in the filter element are separated from the filter element and are exhausted. The method and apparatus can be used for pre-wetting any filter element in any type of liquid, either of the high viscosity type or of the low viscosity type, even though it is particularly suitable for wetting a filter element by a high viscosity liquid and removing trapped air bubbles in the filter element.

20 Claims, 1 Drawing Sheet

METHOD FOR WETTING A FILTER ELEMENT

FIELD OF THE INVENTION

The present invention generally relates to a method and apparatus for wetting a filter element by a liquid and more particularly, relates to a method and apparatus for pre-wetting a filter element with a high viscosity liquid by using a sealable container for containing a pressurized high viscosity liquid and a vibration device mounted on the container for generating vibrations in the filter element such that trapped air bubbles can be separated from the element.

BACKGROUND OF THE INVENTION

In semiconductor processing, a semi-conducting wafer must be processed in a multiplicity of fabrication steps, i.e., as many as several hundred, in order to complete the manufacturing of an IC device. These processing steps may include etching, cleaning, deposition and various other processing procedures. A variety of chemicals, including liquids and gases must be used in the various processing steps either to etch a specific feature on the IC chip, to clean after certain processing steps, to deposit layers from reactant chemicals, or to carry out other necessary processes.

A variety of specialty chemicals are used for photo and metal cleaning processes. An important requirement for such specialty chemicals, i.e., photoresists, developers, spin-on glass and polyimide is the transporting and storage of the material. In the case of a photoresist material, the photo-sensitivity and the lifetime of such a material depends on its storage temperature. It is important to maintain such materials within a specification of between 5° C. and 20° C. for a photoresist/developer and between −20° and 10° C. for spin-on glass/polyimide materials.

The transporting of these specialty chemicals, especially liquids, or the delivery from a storage reservoir (i.e., a holding tank) to a processing chamber where the liquid is used is another important aspect of the fabrication process. A process liquid, such as that of a photoresist or a developer, can normally be transported in a fluid passage such as a stainless steel tubing by electrical pump means. One of such conventional liquid delivery system for a photoresist is shown in FIG. 1.

As shown in FIG. 1, the photoresist delivery system 10 generally consists of a liquid reservoir or a holding tank 12, an electrical pump 16, a filter means 18, a needle valve 22, a manual shut-off valve 24 and a drain tank 28. The outlet 32 from the filter means 18 sprays a jet of the photoresist material onto a rotating wafer such that the wafer can be uniformly coated with a thin layer of the photoresist material. The filter means 18 (or a liquid/air separating means) is a device wherein air bubbles trapped in the photoresist solution can be separated from the solution and be released out of the system through needle valve 22. During the process when the photoresist material 14 contained in the holding tank 12 is pumped by the electrical pump 16, air bubbles can be generated and be trapped in the photoresist solution contained in the flow passage 20. When the liquid containing air bubbles passes through the flow passage 20 and enters into the filter means 18, the air bubbles are more likely separated and cumulated to the top of the filter means 18. A jet of the photoresist solution is then released from outlet 32 onto a rotating wafer 26. During normal operations, the needle valve 22 is opened slightly such that the photoresist liquid containing air bubbles can be pushed out of the filter means 18 through passage 30 and needle valve 22 into a waste drain tank 28. The flow of the waste photoresist solution can further be controlled by a manual shut-off valve 24 positioned in between the needle valve 22 and the drain tank 28.

During normal operations, a small amount of air bubbles can be purged out by the above described procedure, i.e, by leaving the needle valve 22 slightly open such that the pressure in the filter means 18 pushes out air bubbles together with a volume of the photoresist solution. However, when a large volume of air bubbles is generated, i.e., during a maintenance procedure of filter replacement or during a photoresist solution change in the holding tank 12, the filter means 18 cannot effectively exhaust the air bubbles unless a large volume of the photoresist solution is purged out and wasted. In other words, the filter means 18 is no longer effective in separating and accumulating the air bubbles when the volume of the bubbles exceeds a critical amount.

When a wafer surface is coated with a photoresist material, the volume of the photoresist material coated and the resulting photoresist film formed must be quantitatively controlled to a high accuracy. Since the presence of air bubbles in the photoresist solution decreases the amount of the photoresist, the amount of the photoresist material available for covering the wafer surface is reduced accordingly. A non-uniform coating and subsequently, a defective pattern can be produced under such circumstances. A poor coating of photoresist film and a poor patterning can result from such a defective coating process due to the presence of air bubbles.

The filter means 18 is a device which holds a filter element (FIGS. 2 and 2A) therein. The filter element is an expendable part of the fabrication equipment and must be replaced after a certain usage time or after a back pressure measured on the filter element reaches a certain maximum value. The replacement normally occurs when a preventive maintenance procedure is performed on the photoresist supply line. Each time the filter element is replaced, considerable effort must be used to pre-wet the filter element. Since the element is normally constructed of pleated sheets of fused fibers and contains air when the element is in a dry state.

Conventionally, a new filter element is placed in a container and soaked in a thinner material. The soaking time is extensive, i.e., at least one hour, in order to ensure a complete wetting of the filter element. After the element is thoroughly wetted by the thinner material, the element is placed in a photoresist supply line in a filter container. A photoresist liquid must then be purged through the line, i.e., the filter element, to drive out the thinner in the element and to completely replace the thinner with the photoresist liquid. Since the thinner material normally has a substantially lower viscosity than the photoresist liquid, any residual thinner in the photoresist would act as a diluent for the photoresist and causing consistency problems in the photoresist coating formed on a wafer. The photoresist liquid purging process further consumes a significant amount of the material, i.e., in a range of about ⅓ liter of the photoresist liquid. The conventional process for pre-wetting a filter element is therefore not only time consuming but also very costly.

It is therefore an object of the present invention to provide a method for wetting a filter element that does not have the drawbacks or shortcomings of the conventional methods.

It is another method for wetting a filter element for use in a semiconductor fabrication process by a high viscosity liquid.

It is a further object of the present invention to provide a method for wetting a filter element for use in a semiconductor fabrication process by a high viscosity liquid that does not require the use of a thinner material to pre-soak the element.

It is another further object of the present invention to provide a method for wetting a filter element by a high viscosity liquid by utilizing a sealable tank adapted for holding a pressurized high viscosity liquid.

It is still another object of the present invention to provide a method for wetting a filter element with a high viscosity material by using a sealable container that is equipped with a vibration device for vibrating the element soaked in the liquid.

It is yet another object of the present invention to provide a method for wetting a filter element with a high viscosity liquid by placing the element in a sealable container equipped with a vibration device such that trapped air bubbles in the element may be separated from the element.

It is still another further object of the present invention for pre-wetting a filter element with a high viscosity liquid by pressurizing a high viscosity liquid to a pressure higher than 1 atm and vibrating the container at an ultrasonic frequency.

It is yet another further object of the present invention to provide an apparatus for wetting a filter element that includes a sealable container adapted for holding a pressurized liquid and a filter element wherein a vibration device is mounted on the container for generating a vibration in the liquid such that trapped air bubbles are separated from the filter element.

SUMMARY OF THE INVENTION

In accordance with the present invention, a method for wetting a filter element with a high viscosity liquid by using a sealable container that is equipped with a vibration device such that ultrasonic vibration may be generated in a pressurized liquid is provided. The present invention further provides an apparatus that can be used for wetting a filter element with a high viscosity liquid.

In a preferred embodiment, a method for wetting a filter element can be carried out by the operating steps of first providing a sealable container that is filled with a liquid, positioning a filter element in the sealable container immersed in the liquid, pressurizing the liquid to a pressure higher than atmospheric pressure, and vibrating the sealable container at a frequency sufficient to separate air bubbles from the filter element.

The method may further include the step of removing air bubbles from the sealable tank, or the step of pressurizing the liquid by a motor means in the sealable container. The method may further include the step of vibrating the sealable container by a mechanical means, such as ultrasonic means. The method may further include the step of providing a sealable container that is fabricated of a material that transmits ultrasonic vibrations. The sealable container may be pressurized to a pressure at least higher than 1 atm. The sealable container may be vibrated by ultrasonic means at a frequency between about $2 \times 10^6$ Hz and about $3 \times 10^6$ Hz. The filter element may be wetted with a high viscosity liquid, such as a photoresist liquid in a pre-wetting step.

In another preferred embodiment, a method for prewetting a filter element with a high viscosity liquid can be carried out by the steps of providing a sealable container, mounting a vibration device on the sealable container, positioning in the sealable container a filter element containing air therein, filling the sealable container with a high viscosity liquid, pressurizing the high viscosity liquid to a pressure higher than atmospheric pressure, and vibrating the sealable container with the vibration device at a frequency sufficient to separate air from the filter element.

The vibration device may generate vibrations substantially in the ultrasonic frequency range. The sealable container can be sealed from the atmosphere. The pressurizing step can be carried out by a liquid pump. The method may further include the step of filling the sealable container substantially to the top. The vibration frequency utilized in the method may be in the ultrasonic range, such as in the range between about $2 \times 10^6$ Hz and about $3 \times 10^6$ Hz.

The present invention is further directed to an apparatus for wetting a filter element that includes a sealable container adapted for holding a pressurized liquid and a filter element therein, and a vibration device mounted on the sealable container adapted for generating a vibration in the pressurized liquid such that trapped air bubbles are separated from the filter element. The sealable container is made of a material that transmits vibration. The vibration device may generate vibrations in the ultrasonic frequency range.

BRIEF DESCRIPTION OF THE DRAWINGS

Other objects, features and advantages of the present invention will become apparent from the following detailed description and the appended drawings in which.

DETAILED DESCRIPTION OF THE PREFERRED EMBODIMENT

The present invention provides a method and apparatus for wetting a filter element by a high viscosity liquid which can be utilized in any chemical process, and is particularly suitable for use in a semiconductor fabrication process wherein high viscosity liquid is utilized.

The present invention novel apparatus utilizes a sealable container that is fabricated of a material which readily transmits vibration such that a pressurized liquid may be contained therein for pre-wetting the element and for separating trapped air bubbles from the filter element be withdrawn from the sealable container. The high viscosity liquid in the container may be pressurized by a pump means driven by a motor or may be pressurized by any other means including pressurized gas contained in a cylinder.

Figure 1:
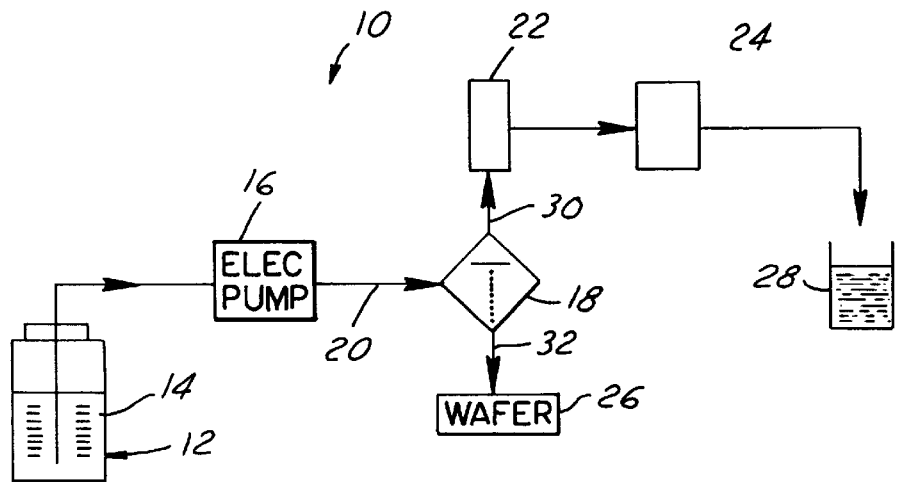
FIG. 1 is a schematic illustrating a conventional photoresist liquid supply system including a filter means.
Figure 2:
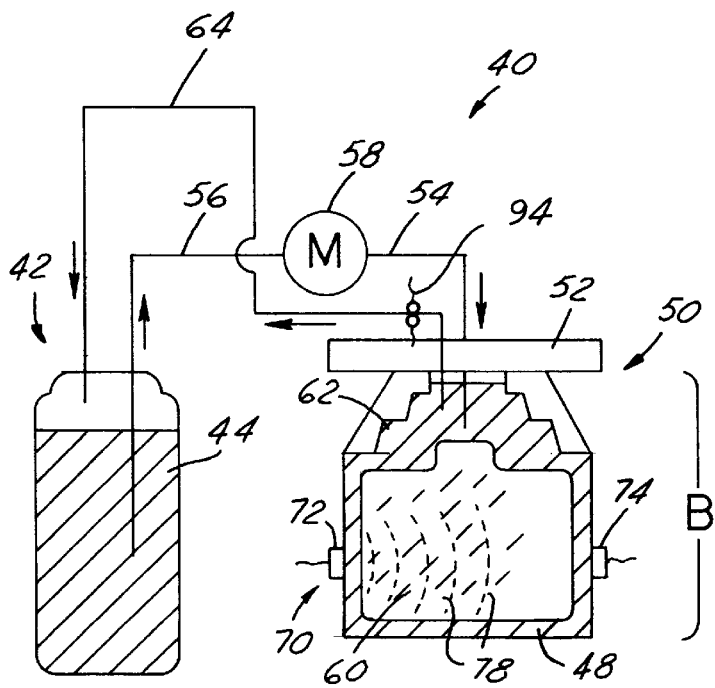
FIG. 2 is a schematic illustrating the present invention apparatus for pre-wetting a filter element with a high viscosity liquid.

Referring initially to FIG. 2, wherein a present invention apparatus 40 is shown. The apparatus 40 consists of a liquid reservoir 42 for supplying a high viscosity liquid 44, a sealable container 50 (part B shown in FIG. 2) for holding pressurized high viscosity liquid 48 and filter element 60, a seal 52 for sealing the sealable member 50, conduit 56 for drawing a high viscosity liquid 44 from the reservoir 42 and feeding to a motor 58, conduit 54 for feeding pressurized liquid 48 into a cavity 62 in the container 50, and conduit 64 for feeding overflown pressurized liquid 48 back into the reservoir 42. The sealable container 50 is equipped with a vibration device 70 which consists of a transmitter 72 and a receiver 74. When the vibration device 70 utilized is a device that vibrates in an ultrasonic frequency range, ultrasonic waves 78 are generated through the pressurized liquid 48 contained in the filter element 60.

Figure 2A:
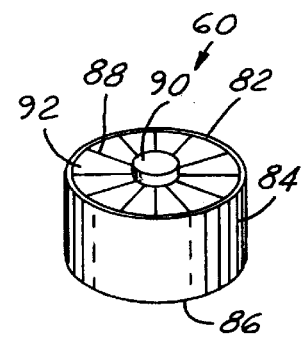
FIG. 2A is a perspective view of a filter element utilized in the presents invention.

A perspective view of the filter element 60 is shown in FIG. 2A. Filter element 60 is constructed by a housing 82 which is normally injection molded of a plastic material having a solid cylindrical side 84, a sealed bottom 86, and a grid-type top 88. A center aperture 90 is provided as a liquid inlet for the filter element 60, while after the liquid is filtered through the filter element (not shown), liquid exits through spaces 92 provided in the grid 88.

A sensor means 94 is also provided on the conduit 64 to monitor the amount of air bubbles exiting the sealable container 50. The sensor means 94 may be of an optical type, or of a sonic type that is effective in detecting fluid density and thus determining the amount of air contained in the fluid flowing through conduit 64.

When the vibration device 70 provided is of the ultrasonic type, a suitable ultrasonic frequency used may be between about $2.0 \times 10^6$ Hz and about $3.0 \times 10^6$ Hz. A suitable value used in the present invention method is $2.5 \times 10^6$ Hz. It should be noted that the frequency utilized for the ultrasonic vibration should be sufficiently high such that air bubbles separates from the filter element and thus travel to the top of the fluid and be carried away by the return conduit 64. When the frequency utilized is too high, the filter element, normally constructed of fibers may have fibers separating from the filter and thus causing degradation of the filter element.

The bubble sensor 94 utilized on the conduit 64 may be of the ultrasonic type which detects a different velocity of the fluid when air bubble is present in the fluid, i.e., the velocity of the ultrasonic wave varies according to fluid density. The bubble detector therefore provides a reliable means for determining whether the pre-wetting process should be continued until no bubble is detected by sensor 94 and thus indicating the filter element 60 has been completely wetted by the high viscosity material. The bubble sensor 94 therefore provides a reliable means for determining the end point of the pre-wetting process.

The present invention novel method and apparatus therefore provides several benefits over the conventional apparatus and method. First, there is no need to immerse a filter element in a thinner material. Secondly, the pre-wetting time by the thinner, i.e., is as long as one hour, can be saved. Thirdly, there is no need for purging the thinner-filled filter element with a high viscosity liquid and thus saving a large amount of the high viscosity liquid resulting in a large cost savings. Fourthly, the module of the sealable container 50 may be readily moved by separating the container 50 from the sealer member 52 to a photoresist supply line and be ready for an operation of a photoresist coating process immediately. This further saves fabrication time and improves its throughput.

The present invention novel method and apparatus has therefore been amply demonstrated in the above descriptions and in the appended drawings of FIGS. 2 and 2A. It should be noted that while the pre-wetting of a filter element by a photoresist liquid is illustrated, the present invention novel method and apparatus can be used to pre-wet a filter element with any high viscosity liquid or any low viscosity liquid. Furthermore, the application of the present invention method and apparatus is not limited to the semiconductor fabrication industry.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

1. A method for wetting a filter element comprising the steps of:
   providing a sealable container filled with a liquid,
   positioning a filter element in said sealable container immersed in said liquid,
   pressurizing said liquid to a pressure higher than atmospheric pressure, and vibrating said sealable container at a frequency of at least $2 \times 10^6$ Hz.

2. A method for wetting a filter element according to claim 1 further comprising the step of removing air bubbles from said sealable tank.

3. A method for wetting a filter element according to claim 1, further comprising the step of pressurizing said liquid by a pump means.

4. A method for wetting a filter element according to claim 1, further comprising the step of vibrating said sealable container by mechanical means.

5. A method of wetting a filter element according to claim 1, further comprising the step of providing a sealable container fabricated of a material that transmits vibration.

6. A method of wetting a filter element according to claim 1, further comprising the step of vibrating said sealable container by ultrasonic means.

7. A method for wetting a filter element according to claim 1, further comprising the step of pressurizing said liquid to a pressure higher than 1 atm.

8. A method for wetting a filter element according to claim 1, further comprising the step of vibrating said sealable container by ultrasonic means at a frequency between about $2 \times 10^6$ Hz and about $3 \times 10^6$ Hz.

9. A method for wetting a filter element according to claim 1, wherein said filter element is wetted with a high viscosity of liquid.

10. A method for wetting a filter element according to claim 1, wherein said filter element is wetted with a photoresist liquid in a pre-wetting step.

11. A method for pre-wetting a filter element with a high viscosity liquid comprising the steps of:
    providing a sealable container,
    mounting a vibration device on said sealable container,
    positioning in said container a filter element containing air therein,
    filling said sealable container with a high viscosity liquid,
    pressurizing said high viscosity liquid to a pressure higher than atmospheric pressure, and
    vibrating said sealable container with said vibration device at a frequency sufficient to separate said air from said filter element.

12. A method for pre-wetting a filter element with a high viscosity liquid according to claim 11, wherein said vibration device generates vibrations substantially in the ultrasonic frequency range.

13. A method for pre-wetting a filter element with a high viscosity liquid according to claim 11, wherein said sealable container being sealed from the atmosphere.

14. A method for pre-wetting a filter element with a high viscosity liquid according to claim 11, wherein said pressurizing step is carried out by a liquid pump.

15. A method for pre-wetting a filter element with a high viscosity liquid according to claim 11 further comprising the step of filling said sealable container substantially to the top.

16. A method for pre-wetting a filter element with a high viscosity liquid according to claim 11, wherein said vibration frequency is in the ultrasonic range.

17. A method for pre-wetting a filter element with a high viscosity liquid according to claim 11, wherein said vibration frequency is between about $2 \times 10^6$ Hz and about $3 \times 10^6$ Hz.

18. An apparatus for wetting a filter element comprising;

a sealable container for holding a pressurized liquid and a filter element therein, and a vibration device mounted on said sealable container for generating a vibration in said pressurized liquid such that trapped air bubbles are separated from said filter element.

19. An apparatus for wetting a filter element according to claim 18, wherein said sealable container is made of a material that transmits vibration.

20. An apparatus for wetting a filter element according to claim 18, wherein said vibration device generates vibrations in the ultrasonic frequency range.

* * * * *